United States Patent [19]

Sainsbury

[11] Patent Number: 5,074,279
[45] Date of Patent: Dec. 24, 1991

[54] DRAFT CONTROLLER FOR OUTDOOR COOKING DEVICE

[76] Inventor: Ian A. N. Sainsbury, Feversham, Ontario, Canada, N0C 1C0

[21] Appl. No.: 511,292

[22] Filed: Apr. 19, 1990

[30] Foreign Application Priority Data

Jun. 16, 1989 [CA] Canada ............................ 603137

[51] Int. Cl.$^5$ .............................................. F24B 3/00
[52] U.S. Cl. .................................. 126/25 B; 126/145; 126/146; 126/283
[58] Field of Search ............... 126/25 B, 29, 144, 145, 126/146, 283

[56] References Cited

U.S. PATENT DOCUMENTS

| | | |
|---|---|---|
| 2,842,116 | 7/1958 | Hinderer . |
| 3,123,062 | 3/1964 | Psarris . |
| 3,132,639 | 5/1964 | Roberts . |
| 3,247,827 | 4/1966 | Cremer . |
| 3,413,935 | 12/1968 | Behrns ............................ 126/25 B |
| 3,628,474 | 12/1971 | Rehwaldt ........................ 126/25 B |
| 4,331,125 | 5/1982 | Storandt ............................ 126/29 |
| 4,592,334 | 6/1986 | Logan, Jr. . |
| 4,777,927 | 10/1988 | Stephen et al. . |

FOREIGN PATENT DOCUMENTS

| | | |
|---|---|---|
| 607965 | 11/1960 | Canada . |
| 660408 | 4/1963 | Canada . |
| 815857 | 6/1969 | Canada . |
| 1162123 | 2/1984 | Canada . |

Primary Examiner—Carroll B. Dority

[57] ABSTRACT

A draft controller for use with a combustible solid fuel comprises an elongated band of heat-resistant material such as sheet metal which can be flexed so that attachment devices provided on the ends of the band can be interengaged to provide an open-topped container of adjustable size and which can then be disposed on a fuel-supporting surface, for example, within a barbecue, to confine the fuel to a limited area. Or, the ends of the band can be left open to confine the fuel in a broader, shallower area. In one embodiment, the flow of combustion air to and across the top surface of the burning fuel can be controlled by forming the band with a width which varies between its two ends. In another embodiment, air flow openings are provided in the band of different sizes and/or spacings. In both embodiments, the position of the container so formed can be rotationally adjusted to optimize combustion and top surface burning of the fuel having regard to the strength of the wind. The container can also be formed from a plurality of such bands releasable interconnected, end-to-end.

9 Claims, 2 Drawing Sheets

DRAFT CONTROLLER FOR OUTDOOR COOKING DEVICE

FIELD OF THE INVENTION

The present invention relates to a draft controller especially suited for use with a charcoal-burning barbecue of conventional construction.

BACKGROUND OF THE INVENTION

Numerous situations arise in which it is desired to confine a bed of solid fuel to a restricted area of a fuel-supporting surface and then to be able to control or adjust the flow of combustion air to the burning fuel.

For example, it has heretofore been recognized that it is sometimes desired to use a conventional charcoal-burning barbecue to grill or cook a relatively small amount or portion of food and that, in such a situation, it is wasteful of charcoal and ignition fluid to have to fill the barbecue from rim to rim with charcoal briquettes. Difficulties arise, however, if is attempted to confine the briquettes to a limited area of the barbeque since frequently it then becomes difficult in practice to build up a physically stable and sufficiently deep bed of briquettes to establish the proper cooking conditions.

In U.S. Pat. No. 4,592,334, there is provided a device for confining a bed of charcoal briquettes to a restricted area of such a barbecue and, while that device does to a considerable extend achieve the desired result, its use in practice present certain problems.

It is generally accepted that, for the successful operation of a charcoal-burning barbecue with no auxiliary heating system, it is necessary to establish a hot bed of charcoal of fairly uniform temperature throughout. Obviously, the larger the bed both in diameter and depth, the more easily such a uniform temperature can be established. When the charcoal bed is confined to a restricted area of the barbecue, there is a much greater likelihood of there occurring a non-uniform bed temperature. One important cause of this is from the effect of any wind blowing across the charcoal bed. For example, such a wind may cause the upper surface of the charcoal bed to burn overly vigorously while allowing combustion of the lower portion of the charcoal bed to slow down and so fall to a lower temperature. On the other hand, with a stronger wind, combustion at the windward side of the charcoal on its top surface may be totally eliminated. These effects can even lead to total combustion failure.

It is accordingly an important object of this invention to provide a draft controller for use with a conventional charcoal-burning barbecue and by means of which the bed of burning charcoal can be confined to a restricted area of the barbecue while at the same time providing means whereby the draft to the charcoal can be controlled to optimize the maintenance of a uniform temperature throughout the bed of burning charcoal.

It is another object of the invention, in accordance with another feature thereof, to provide a draft controller for the aforesaid purposes and which draft controller can be packaged and stored in a relatively compact form.

Other objects of the invention will become apparent as the description herein proceeds.

SUMMARY OF THE INVENTION

In accordance with one aspect of this invention, there is provided a draft controller for use as a combustible solid fuel container adapted to be supported on a fuel-supporting surface and which draft controller can broadly be defined as comprising an upstanding container comprising a side wall of heat resistant material and having a lower peripheral edge defining a generally planar locus and adapted supportedly to be disposed on such a fuel-supporting surface, and the side wall being adapted to permit and vary the supply of combustion air to burning fuel confined within the container on adjustment of the rotational disposition of the container on the fuel-supporting surface thereby in turn to optimize the combustion maintenance effect of any wind blowing across such fuel-supporting surface and across the burning fuel confined within the container.

In accordance with one embodiment of the invention, the side wall of such a container has an upper peripheral edge spaced apart from the lower peripheral edge a distance which varies around the periphery of the container.

Generally, the side wall of such a container will be formed with air flow openings therethrough for the flow of combustion air to burning fuel confined within the container, and with spaced apart notches extending upwardly thereinto from the lower peripheral edge thereof so that, when the container is supported on a fuel-supporting surface, openings are provided above that fuel-supporting surface for the flow of combustion air inwardly therethrough and then upwardly through burning fuel confined within the container.

A draft controller in accordance with this invention is usefully formed from an elongated band having a first edge extending between first and second ends of the elongated band; a second edge spaced apart from the first edge and also extending between the first and second ends thereof; a width between the first and second edges which varies between the first and second ends; first attachment means at the first end of the elongated band; and second attachment means at the second end of the elongated band and engaging the first attachment means to provide the container having a varying height around its periphery and in which the first edge of the elongated band constitutes the lower peripheral edge.

In one embodiment of this invention, a draft controller in accordance therewith is formed from an elongated band having a uniform width between its first and second edges but such band is formed in its second edge with spaced apart notches which extend different distances into the band and toward the first edge thereof so effectively to provide a band having an effective width between said first and second edges thereof which varies between the first and second ends thereof.

In such an embodiment, the first and second attachment means are advantageously releasably interengaged whereby the first and second ends of the elongated band can be secured together to provide the container and released from each other for storage purposes.

Usefully, a plurality of said second attachment means are provided mutually spaced between the first and second ends of the elongated band so that, on engagement of the first attachment means with different ones of such second attachment means, containers of different sizes can be obtained.

If desired, a plurality of such elongated bands interconnected in end-to-end disposition by such first and second attachment means can be used to provide the container. The draft controller may also be used "opened up" without the two ends being actually fastened together.

In another embodiment of a draft controller in accordance with this invention, the side wall is formed with air flow openings therethrough for the flow of combustion air to burning fuel confined within the container, the percentage of the area of the side wall occupied by such openings varying around the periphery of the side wall.

Draft controllers in accordance with this invention can be utilized in many different situations. They may, for example, be used for confining a bed of fuel for a camp fire in which case the container would be supported on a flat rock outcrop or other level surface. However, they find particular application for use in barbecues for the purposes herein indicated.

Other features of the invention and the advantages presented thereby will become apparent as the description herein proceeds.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will now be described merely by way of illustration with reference to the accompanying drawings in which.

DESCRIPTION OF THE PREFERRED EMBODIMENTS

Figure 1:
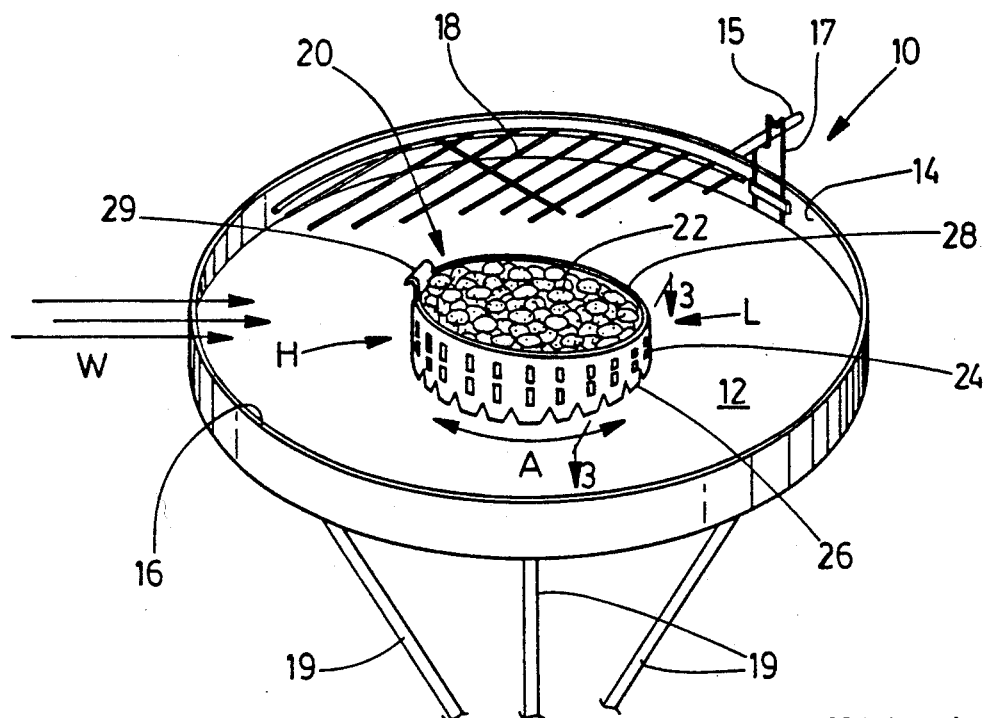
FIG. 1 is a fragmentary perspective view of a charcoal-burning barbecue having disposed therein one embodiment of a draft controller in accordance with this invention.

Referring first to FIG. 1 of the accompanying drawings, there is indicated generally at 10 therein a charcoal-burning barbecue of a conventional type. The barbecue 10 comprises a base or charcoal-supporting surface 12 integrally formed with an upstanding peripheral wall 14 defining a top edge 16. A grill shown fragmentarily at 18 is removably and adjustably supported above the base 12, for example, by angularly spaced apart arms 15 resting on brackets 17 in turn secured to the wall 14 in a conventional manner. It will be understood that only one arm/bracket combination is shown in FIG. 1 but that at least three such arms and brackets will be provided around the wall 14. The grill 18 supports food such as steaks, hamburgers, frankfurters, or the like which are to be cooked by the heat and/or flames rising from the burning charcoal within the barbecue 10. The barbecue 10 is shown in FIG. 1 as being supported by legs 19.

Since the barbecue 10 is of conventional construction, it will not be described in greater detail herein.

As hereinbefore indicated, the purpose of this invention is to provide an improved device for permitting charcoal or other solid fuel to be confined to a limited area of a supporting surface such as the surface 12 when it is not required to have burning fuel across the full extent of such surface.

One embodiment of a draft controller for such purpose is indicated generally at 20 in FIG. 1. The draft controller 20 is shown as confining burning charcoal 22 to a restricted area of the supporting surface 12.

The device 20 is generally in the form of a container having an upstanding side wall 24 having a first or lower edge 26 which defines a generally planar locus and which is supported on the surface 12 and, upwardly thereof, a second or upper edge 28. If desired, the device 20 can be provided with a lifting means or handle 29.

The container/draft controller 20 is usefully formed from an elongated band 30 (FIG. 2) of bendable and heat-resistant material, such as sheet steel. Openings 32 are formed in the band 30 to permit the flow of combustion air therethrough to the burning charcoal 22 confined within the container 20. In this embodiment, two rows of such openings 32 are provided.

In proximity to a first end 34 of the elongated band 30, there are stamped therefrom, a pair of vertically spaced apart tongues 36 which can be removably engaged (FIG. 3) in any desired pair of openings 32.

Figure 3:
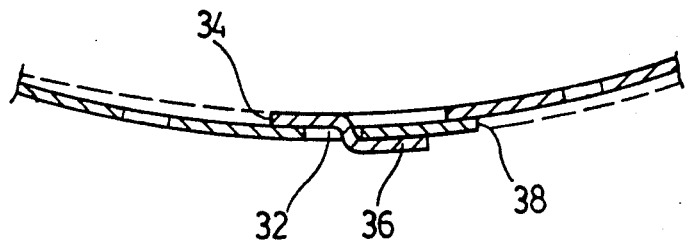
FIG. 3 is a fragmentary sectional view through the draft controller of FIG. 1 when taken as indicated by the arrows 3—3 of that figure with an alternate position shown in phantom.

By flexing the band 30 and inserting the tongues 36 into a selected pair of the openings 32 or other openings provided for such purpose, the band is formed into the generally cylindrical configuration shown in FIG. 1. By selecting an appropriate pair of the openings 32, the diameter of the device or container 20 can be varied, as desired as shown in phantom in FIG. 3. Since the openings 32 are regularly spaced apart, at least adjacent either end of the band 30, as shown in FIG. 3, the openings 32, adjacent such opposite ends, will register with one another, in all such positions, thus ensuring unrestricted air flow. Alternatively the tongues may be left disengaged so that the two ends of the device are "open" depending on the area of coals it is desired to use, as shown in phantom in FIG. 5.

Figure 2:
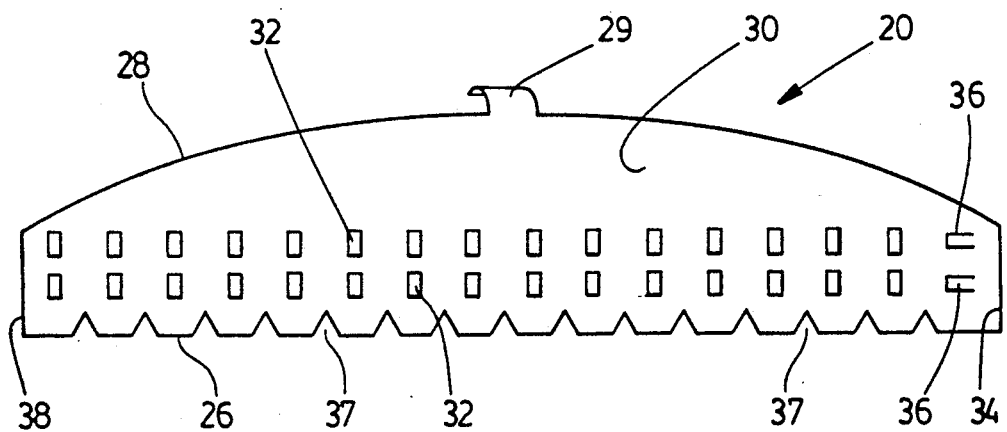
FIG. 2 is a side elevation of the draft controller of FIG. 1 shown in its open configuration.

Referring further to FIGS. 1 and 2, it will be seen that the band 30 is formed along its lower edge 26 with a plurality of mutually spaced apart notches 37 further to permit the flow of combustion air inwardly therethrough and then upwardly through the charcoal 22 confined within the container. While such notches 37 are formed in the lower edge 26, it will be appreciated that, when the band 30 is in its assembled configuration, the edge 26 still defines a generally planar but discontinuous locus or edge adapted supportedly to be disposed on the barbecue surface 12.

In accordance with one preferred feature of this invention, the width of the band 30, i.e. the distance between the upper and lower edges 28 and 26 respectively varies between the first end 34 and a second end 38. In the embodiment shown in FIGS. 1 and 2, the band 30 is shown as having a maximum width at a position generally equidistant its two ends 34 and 38. Consequently, when the band is assembled, the resulting container will have a high side and a low side indicated respectively at H and L in FIG. 1.

The use of a band 30 of varying width is advantageous in that it allows the rotational position of the container or device 20 on the charcoal-supporting surface 12 to be adjusted in the directions indicated by the double-headed arrow A (FIG. 1) to optimize the effect of any wind W blowing across the surface of the barbecue. In general, it has been found to be desirable to position the device 20 so that its high side H faces into any such wind so preventing excessive top surface combustion and/or cooling of the charcoal.

Figure 4:
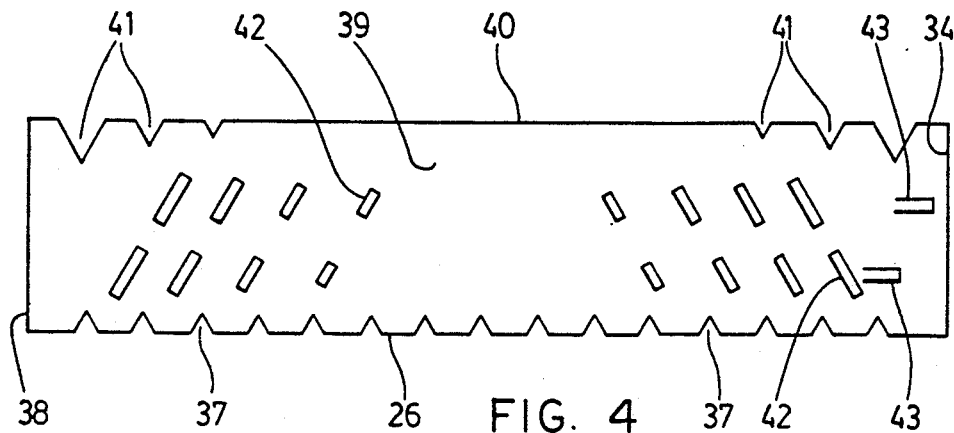
FIG. 4 is a side elevation of another embodiment of a draft controller in accordance with this invention also shown in its open configuration.

Reference will next be made to FIG. 4 which shows generally at 39 a band generally similar to the band 30 already described herein in that it has a lower edge 26 formed with notches 37. The upper edge 40 of the band 39 is, however, parallel to the lower edge 26 and is also formed with spaced apart notches 41 which increase in depth, i.e. the extent to which they extend toward the lower edge 26, toward the ends 34 and 38 of the band 39. Consequently, while the band 39 is formed from a strip of material having a uniform width, in use its effective wind-foiling width varies between its two ends.

In accordance with yet another possible feature of this invention, two rows of air flow openings 42 are provided in the band 39. It will be seen that, in this embodiment, the lengths of these openings 42 decreases inwardly from the ends of the band 39 while their longitudinal separation increases in the same direction. It is also to be noted that the openings 42 in one row are longitudinally offset from the openings in the other row so reducing the risk of there being transverse lines of weakness which might become permanently creased during use. To accommodate such longitudinal displacement of the openings 42, the tongues 43 by means of which the band 39 can be secured in its assembled configuration are similarly longitudinally offset from each other.

Figure 5:
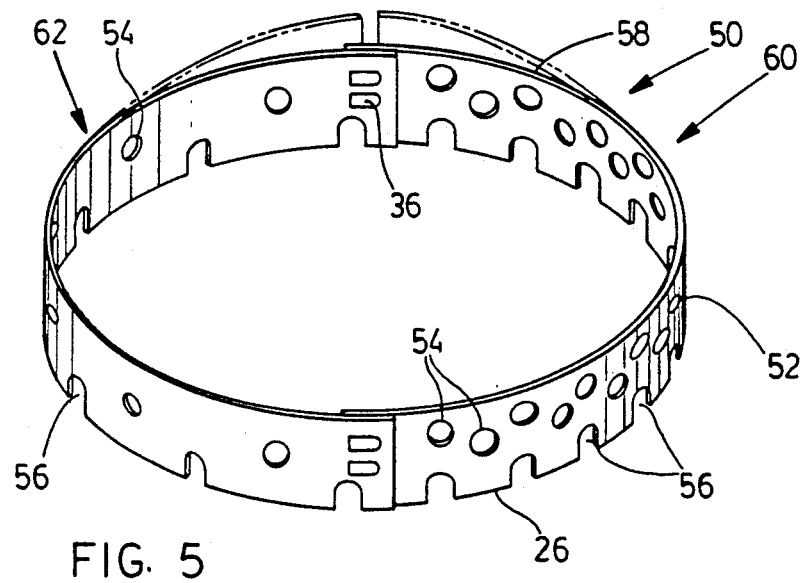
FIG. 5 is a perspective view of another embodiment of a draft controller in accordance with this invention shown with its ends closed, and showing in phantom its ends opened up and disengaged, and, FIG. 6 is a somewhat simplified perspective view of yet another embodiment of a draft controller in accordance with this invention.

Reference will next be made to FIG. 5 of the accompanying drawings in which there is illustrated generally at 50 an alternative embodiment of the present invention.

The draft controller 50 is similar to the device 20 already described in that, when assembled, it has the form of an upstanding generally cylindrical container having a lower edge 26 intended to be supported on the charcoal-supporting surface 12 of a barbecue and to confine therewithin burning charcoal briquettes. The device 50 has an upstanding side wall 52 having air flow openings 54 formed therethrough and notches 56 extending upwardly from the lower edge 26. It will, however, be noted that the openings 54 and the notches 56 are shown as being circular and generally semi-circular respectively in distinction to the rectangular openings and triangular notches as illustrated in the preceding figures. The device 50 is defined by an upper edge 58 parallel to the lower edge 26.

It is also to be noted that the openings 54 and the notches 56 are more closely spaced around part of the side wall 52 than they are around the remaining part of that side wall. Consequently, the percentage of the area of the side wall occupied by such openings and/or notches varies around the periphery of the side wall. This permits the device 50 to be rotated for optimum orientation with respect to the direction of any wind blowing across the barbecue.

In accordance with another feature of this invention, the device 50 can be formed from a plurality of separate bands, in this case the two bands generally indicated at 60 and 62 in distinction to the single band 30 of the device 20. The two bands 60 and 62 are assembled in end-to-end disposition with tongues 36 at a first end of each said band being received within corresponding openings provided at a second end of the other said band. Three or more such bands could be used, if desired.

By manufacturing the device as a plurality of bands, it can be packaged and shipped in a much smaller space.

Figure 6:
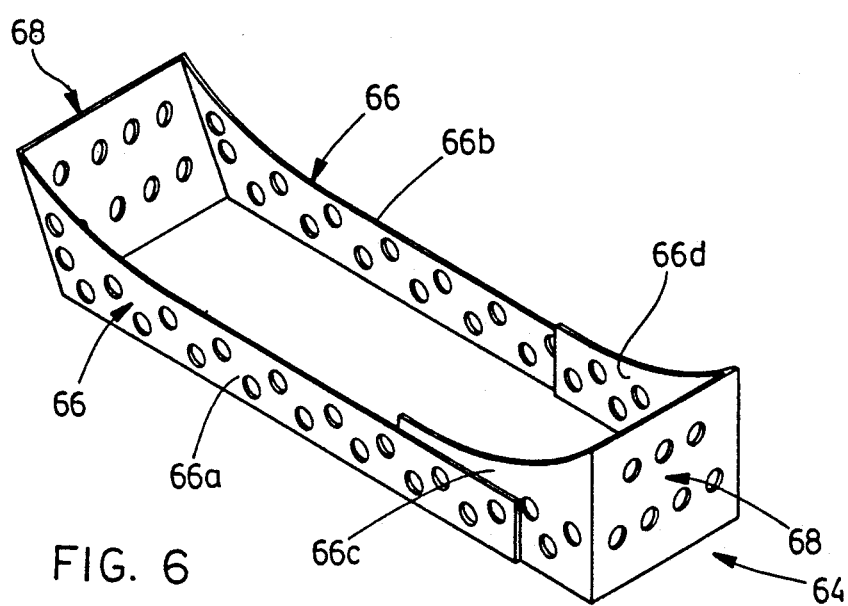

Reference will finally be made to FIG. 6 of the accompanying drawings in which there is indicated generally at 64 one embodiment of a device in accordance with this invention and which has a somewhat different configuration. The device 64, when assembled as shown, has a generally rectangular configuration with side walls 66 and end walls 68. The end walls 68 are of equal and uniform height while the side walls 66 each has a height which decreases inwardly in the directions away from the end walls 68. If desired, the device 64 can be formed in two parts, as shown, to permit adjustment of its length.

In the embodiment shown, the device 64 comprises a first part comprising one of the end walls 68 and integrally formed therewith two side wall portions 66a and 66b. The second component comprises the other end wall 68 and integrally formed therewith two side wall portions 66c and 66d. Suitable attachment means (not shown) are provided for releasably attaching the side wall portions 66a, 66b to side wall portions 66c, 66d respectively in overlapping disposition.

It will be appreciated that the various features hereinbefore described for the various embodiments can be combined in a single device. For example, a device can be formed with both a varying height as well as with air flow openings having sizes and/or spacings which vary about the periphery of the side wall.

The foregoing is a description of preferred embodiments of the invention which is given here by way of example only. The invention is not to be taken as limited to any of the specific features as described but comprehends all such variations thereof as come within the scope of the appended claims.

What is claimed is:

1. A draft controller for use as a combustible solid fuel container adapted to be supported on a fuel-supporting surface and which draft controller comprises an elongated band of heat-resistant material and having:
   a first edge extending between first and second ends of said elongated band;
   a second edge spaced apart from said first edge and also extending between said first and second ends thereof and in which said elongated band has a width between said first and second edges thereof which varies between said first and second ends thereof, and in which the width of said elongated band has a maximum value intermediate said first and second ends thereof and defines smoothly arced curves towards each said end;
   first attachment means at said first end of said elongated band;
   second attachment means at said second end of said elongated band and inter-engageable with said first attachment means to provide a container in which said first edge of said elongated band defines a lower peripheral edge defining a generally planar locus and adapted supportedly to be disposed on a fuel-supporting surface;

air flow openings formed through said side walls for the supply of combustion air to burning fuel confined within said container, and whereby the supply of combustion air to burning fuel confined within said container can be varied by adjustment of the rotational disposition of said container on the fuel-supporting surface thereby in turn to optimize the combustion maintenance effect of any wind blowing across such fuel-supporting surface and across the burning fuel confined within said container;

said openings adjacent said end portions of said elongated band being equally spaced apart from one another, and said openings adjacent said second end defining said second attachment means;

whereby said first attachment means may be engaged selectively with alternate said openings adjacent said second end to vary the size of said container, with said openings registering with one another.

2. A draft controller as claimed in claim 1 and in which said elongated band has a width between said first and second edges thereof which varies between said first and second ends thereof.

3. A draft controller as claimed in claim 1 and in which said elongated band is formed in said second edge thereof with spaced apart notches which extend different distances into said band toward said first edge thereof.

4. A draft controller as claimed in claim 1 and in which said elongated band has its maximum width essentially equidistant said first and second ends thereof.

5. A draft controller as claimed in claim 1 which comprises at least one row of mutually equally spaced said air flow openings which in turn constitute a plurality of said second attachment means for engagement by said first attachment means so to provide a said container having an adjustable size.

6. A draft controller as claimed in claim 5 and which comprises at least two rows of said air flow openings, the openings in said rows being linearly offset from each other.

7. A draft controller as claimed in claim 1 and in which said elongated band is formed with spaced apart notches extending thereinto from said first edge thereof so that, when said container is supported on a fuel-supporting surface, openings are provided above that fuel-supporting surface for the flow of combustion air inwardly therethrough and upwardly through burning fuel confined within said container.

8. A draft controller as claimed in claim 1 and in which said air flow openings are provided in said elongated band so that the percentage of the area of said side wall occupied by said openings varies around the periphery of said side wall.

9. A draft controller as claimed in claim 8 including spaced apart notches extending into said elongated band from said first edge thereof so that, when said container is supported on a fuel-supporting surface, further air flow openings are provided by said notches above that fuel-supporting surface for the flow of combustion air inwardly therethrough and then upwardly through burning fuel confined within said container.

* * * * *